United States Patent [19]

Glover et al.

[11] Patent Number: 4,554,633
[45] Date of Patent: Nov. 19, 1985

[54] SAMPLED DATA CT SYSTEM INCLUDING ANALOG FILTER AND COMPENSATING DIGITAL FILTER

[75] Inventors: Gary H. Glover, Waukesha; Dennis G. DallaPiazza, Oconomowoc; Norbert J. Pelc, Wauwatosa, all of Wis.

[73] Assignee: General Electric Company, Milwaukee, Wis.

[21] Appl. No.: 428,771

[22] Filed: Sep. 30, 1982

[51] Int. Cl.⁴ .......................... G06F 15/42; G01T 1/17
[52] U.S. Cl. .................................... 364/414; 364/572; 364/724; 364/825; 378/901
[58] Field of Search ................. 364/414, 200 MS File, 364/900 MS File, 724, 825, 572; 378/901

[56] References Cited

U.S. PATENT DOCUMENTS

| | | | |
|---|---|---|---|
| 3,787,827 | 1/1974 | Stout | 364/900 X |
| 3,935,437 | 1/1976 | Schmitt et al. | 364/572 X |
| 3,937,897 | 2/1976 | Song | 340/347 DD |
| 4,093,989 | 6/1978 | Flink et al. | 364/572 X |
| 4,096,576 | 6/1978 | Takashi et al. | 364/825 X |
| 4,112,412 | 9/1978 | Howlett | 367/79 |
| 4,135,247 | 1/1979 | Gordon et al. | 364/414 |
| 4,149,259 | 4/1979 | Kowalski | 364/414 X |
| 4,359,608 | 11/1982 | Watson et al. | 381/32 |

OTHER PUBLICATIONS

Oppenheim, A. V. et al *Digital Signal Processing*, Prentice-Hall Inc: Englewood Cliffs, NJ, 1975, 132–133.
Soliman, A. M. et al., "Phase Correction in Two-Integrator Loop Filters Using a Single Compensating Resistor", *Electronics Letters*, vol. 14, No. 12, Jun. 1978, 375–376.

Primary Examiner—Jerry Smith
Assistant Examiner—Clark A. Jablon
Attorney, Agent, or Firm—Leydig, Voit & Mayer, Ltd.

[57] ABSTRACT

A CT scanner in which the amount of x-ray information acquired per unit time is substantially increased by using a continuous-on x-ray source and a sampled data system with the detector. An analog filter is used in the sampling system for band limiting the detector signal below the highest frequency of interest, but is a practically realizable filter and is therefore non-ideal. A digital filter is applied to the detector data after digitization to compensate for the characteristics of the analog filter, and to provide an overall filter characteristic more nearly like the ideal.

6 Claims, 10 Drawing Figures

SAMPLED DATA CT SYSTEM INCLUDING ANALOG FILTER AND COMPENSATING DIGITAL FILTER

This invention relates to CT scanners and more particularly to the scanner elements used to convert the individual detector readings to a form suitable for processing by the reconstruction computer.

One of the important directions in which CT technology has been advancing is the production of better images, those containing more diagnostically useful information. An important factor in accomplishing that is adequate resolution of the detector data itself, which is necessary to distinguish slight changes in body absorption with good spatial resolution. In addition, it is also useful to provide fast scan capabilities to minimize artifacts caused by body motion.

Those requirements have a direct impact on the acquisition electronics which convert the signals produced in the detector channels into digital form for processing by the reconstruction computer.

As late as 1981, a successful state of the art scanner had the capability of producing 576 views having 512 channel readings per view in about 9.6 seconds. That system was based on integrating the current produced in each detector cell, with the integrated magnitude then being digitized for use by the reconstruction computer. The x-ray source was pulsed at about a 60 Hz. rate, and the integration period was set to be slightly greater than the duration of a pulse.

In order to further improve the images produced by that scanner, it would be desirable to increase the rate at which detector data could be acquired. That would allow not only faster scanning speeds, but also gathering of additional information from each scan for reconstructing better images.

In order to gain a significant increase in the rate of acquiring detector information, it is desirable to use a continuous-on (rather than pulsed) x-ray source, and to associate a sampled data system (rather than integrating electronics) with the detector channels. However, sampled data systems have their own unique problems in achieving accuracies equivalent to those of the prior integrating system. The sampling process itself, as well as the filtering normally associated with it, can introduce distortion, making the rapidly acquired views less useful in reconstructing better images.

It is well known that in sampled data systems, the Nyquist theorem requires a sampling rate at least twice the highest frequency of interest in order to accurately reconstruct the original spectrum or signal. Conventionally, analog filters are used to band limit the signal before sampling, to frequencies below the highest frequency of interest in order to minimize the effects of noise and to prevent higher frequency components from introducing aliasing-type distortion.

A perfect filter would have zero attenuation up to the cutoff frequency, a perfectly sharp cut-off, and infinite attenuation beyond cutoff. As a practical matter, that kind of analog filter can simply not be implemented. To the extent that the implemented filter alters the signal below the cutoff frequency or passes the signal or noise above the cutoff frequency, it introduces distortion into the sampling process. Some applications for sampled data systems can tolerate such distortion, but high quality CT is very demanding in the performance required of the data acquisition system.

Another filter related problem with a sampled data CT system is the typical requirement for selectability among several different scan speeds. Since the bandwidth of the information contained in the data from a detector is proportional to scan speed, an efficient system would modify the bandwidth, and the sampling and cutoff frequencies, as the scan speed is changed. Switchable analog filters with selectable cutoff frequencies would not however appear to be an attractive way to address this problem.

A final problem which can arise with this type of system, particularly in connection with high resolution detectors, is the possibility of acquiring data faster than it can be stored on system disk. The speed at which the CT computer can write information to disk sets a limiting factor on how quickly data can be acquired. A typical rate using available computers is about 280,000 words per second. One of the scanners of concern here has a 736 channel detector, and it is desirable to sample each of those channels at a one millisecond sampling rate. That produces a 736,000 word per second data rate, substantially higher than can be accommodated by the reconstruction computer. Creating a buffer in computer memory sufficient to accommodate that disparity in data rates is not a practical alternative.

In view of the foregoing, it is an aim of the present invention to adapt sampled data systems to a high resolution CT environment.

Furthermore, an object of the present invention is to accomplish that aim without the penalty of introducing significant distortion from sampling.

According to one aspect of the invention, it is an object of the present invention to use a realizable analog filter in the sampling system, but to provide additional means for compensating the analog filter characteristic to make the composite characteristic more nearly ideal.

It is a related object of the invention to provide such compensating means with the ability to band limit the information in accordance with the scan speed.

Finally, an object of the present invention is to provide means for limiting the data rate to a rate compatible with the storage capabilities of the system.

Other objects and advantages will become apparent from the following detailed description when taken in conjunction with the drawings in which.

While the invention will be described in connection with certain preferred embodiments, it is not intended to limit it to those embodiments. On the contrary, the intent is to cover all alternatives, modifications and equivalents included within the spirit and scope of the invention as defined by the appended claims.

Figure 1:
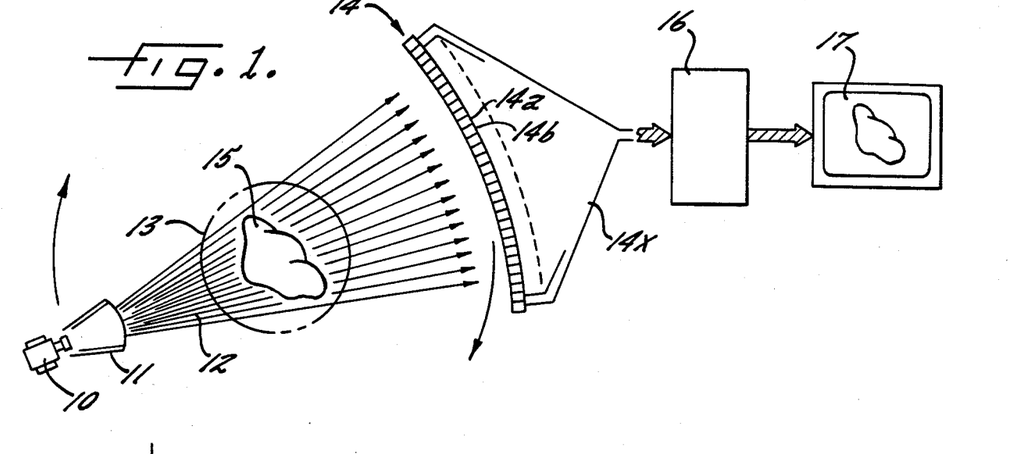
FIG. 1 is a schematic view illustrating the major elements of a CT scanner.

Turning now to the drawings, FIG. 1 schematically illustrates the major elements of a CT scanner. The scanner includes a source of penetrating radiation 10, very often in the form of a rotating anode x-ray tube. The radiation produced by the x-ray tube 10 is collimated at 11 to produce a thin fan beam of radiation 12 which is projected through a patient aperture 13 toward an x-ray detector array 14. A body to be examined, such as a patient 15, is positioned within the patient aperture 13 in the path of the fan beam of x-rays 12 such that the beam passing through the body is attenuated in dependence on the density of the objects encountered. As a result, each detector cell 14a, 14b, etc., produces an electric signal which is dependent on the intensity of the radiation received within the cell. Such x-ray readings are taken from each cell at a plurality of angular positions with respect to the patient, as the source and detector array are rotated about the patient aperture. Each set of readings at a particular angle is often referred to as a projection or view. The projection can be considered to be made up of a number of elements, each element representing one of the detector readings. The readings for each projection are digitized and fed to a reconstruction computer 16 which can use any of a number of available algorithms to produce the image of the cross-section traversed by the fan beam. The image can be displayed on a CRT 17, or alternatively can be used to create a film for further study by a diagnostician.

As noted above in connection with the prior scanner, individual detector readings for each view have been produced by pulsing the x-ray source 10 and integrating the current from each detector channel 14a, 14b, followed by digitization of the integrated magnitudes. In practicing the present invention, the x-ray source 10 need not be pulsed, and the detector array 14 has means 14x associated therewith for sampling the detector signals followed by digitization of the samples, such means being specially configured to significantly reduce the distortion typically introduced by the sampling process.

Figure 2:
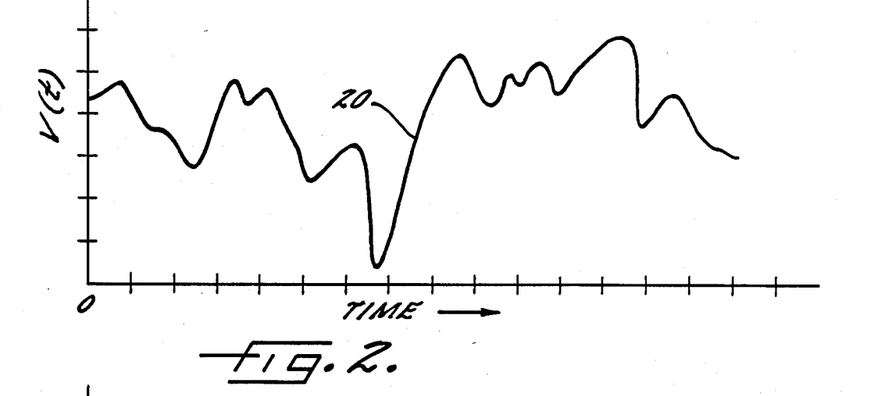
FIG. 2 is a diagram showing the signal for a typical detector over a complete scan.
Figure 3:
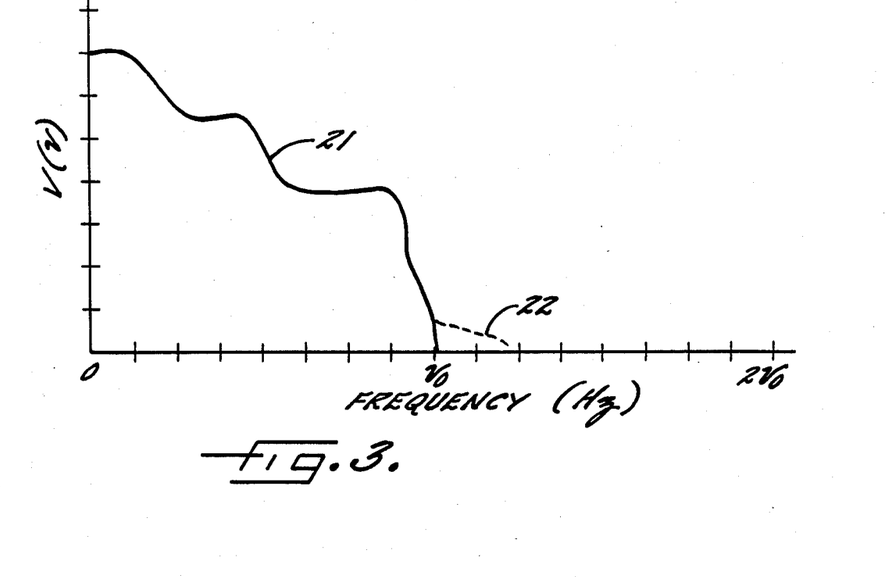
FIG. 3 is a diagram illustrating the frequency spectrum of the signal of FIG. 1.

The difficulties encountered in adapting a sampled data system to a CT scanner are best understood with reference to FIGS. 2-5. FIG. 2 illustrates the signal produced by a single detector channel, as the source and detector make a complete revolution about the body. The attenuation characteristic of the body causes the magnitude of the signal to vary over a reasonably large range, and with a frequency spectral characteristic typically dictated not only by the object but also by the size of the detector aperture, the scan rotation speed and geometrical magnification factors. For the particular type of scanner being discussed here, the spectrum is limited to frequencies up to about 350 Hz for the 2 second "fast scan". FIG. 3 illustrates the frequency spectrum of the detector channel signal of FIG. 2, and is in the nature of a plot of amplitude against frequency. The solid line portion 21 of FIG. 3 shows a spectrum that has been band limited to frequencies below $\nu_0$. The dotted line 22 shows components beyond $\nu_0$ that may have been contained in the signal prior to band limiting.

It is known by the Nyquist theorem, that in order to accurately reconstruct the original spectrum 21, it is necessary to sample the original signal at a frequency at least twice the highest frequency present in the signal. If a sampling rate of $2\nu_0$ is used, any components having frequencies higher than $\nu_0$ (such as dotted line portion of the spectrum 22 or noise), if not removed prior to sampling, will cause aliasing or other forms of distortion. Thus, it is typical to apply an analog filter to the signal 20 prior to sampling in order to remove such unwanted spectral components.

Figure 4:
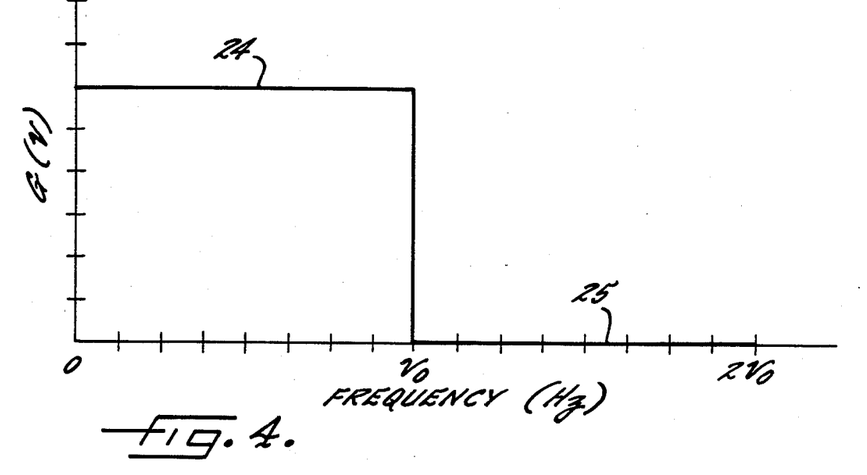
FIG. 4 illustrates a perfect filter characteristic.

From one point of view, the perfect filter for the application is illustrated in FIG. 4. It is seen that at frequencies below $\nu_0$, the characteristic has a portion 24 which provides complete transmission, whereas at frequencies higher than $\nu_0$ the characteristic 25 provides complete attenuation. The rolloff slope is infinite at frequency $\nu_0$. Thus, the spectrum 21 is completely preserved without distortion whereas everything outside the spectrum 21 is completely eliminated. While the filter in FIG. 4 is ideal in that it has complete transmission in the pass band and complete attenuation after the cutoff, it may not be ideal from other standpoints (e.g., ringing). The choice of an optimal filter response is not a simple one.

Figure 5:
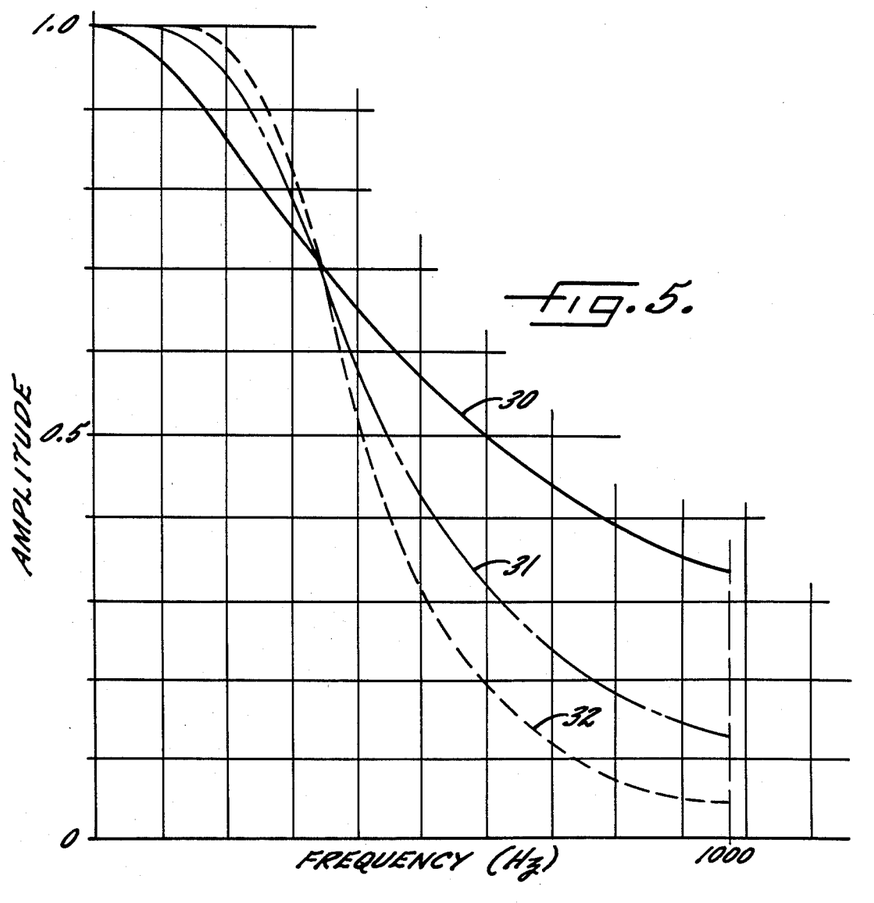
FIG. 5 illustrates filter characteristics of realizable analog filters.

At any rate, a filter characteristic such as FIG. 4 is, as a practical matter, impossible to achieve in an analog filter. First of all, only a finite slope at $\nu_0$ can be achieved, particularly with inexpensive implementable, say less than 3 pole, filters. Filter characteristics are illustrated in FIG. 5 for a plurality of Butterworth filters wherein characteristic 30 is for one pole filter, characteristic 31 for a two pole filter, and characteristic 32 is for a three pole Butterworth filter. It is seen that even with the three pole filter the rolloff characteristic is not particularly sharp, which causes attenuation of signals within the desired frequency band and/or passing of signals beyond the desired spectrum. If the cutoff frequency is chosen low enough to prevent components beyond $\nu_0$ from being passed, then undesirable loss of signals at low frequencies within the desired spectrum occurs. Similarly, if the cuttoff frequency is chosen higher to minimize attenuation of frequencies within the pass band, then signals beyond $\nu_0$ will not be eliminated and will cause aliasing.

In accordance with the invention, an implementable analog filter is used to filter the detector signal prior to sampling, and after digitization means are provided for modifying the digital signals to compensate for the non-ideal characteristic of the analog filter, to produce a composite characteristic which is more nearly ideal. The amplitude response of the digital filter can be tailored to amplify or attenuate particular frequencies. Also, the phase response or group delay of the filter can be adjusted.

Figure 6:
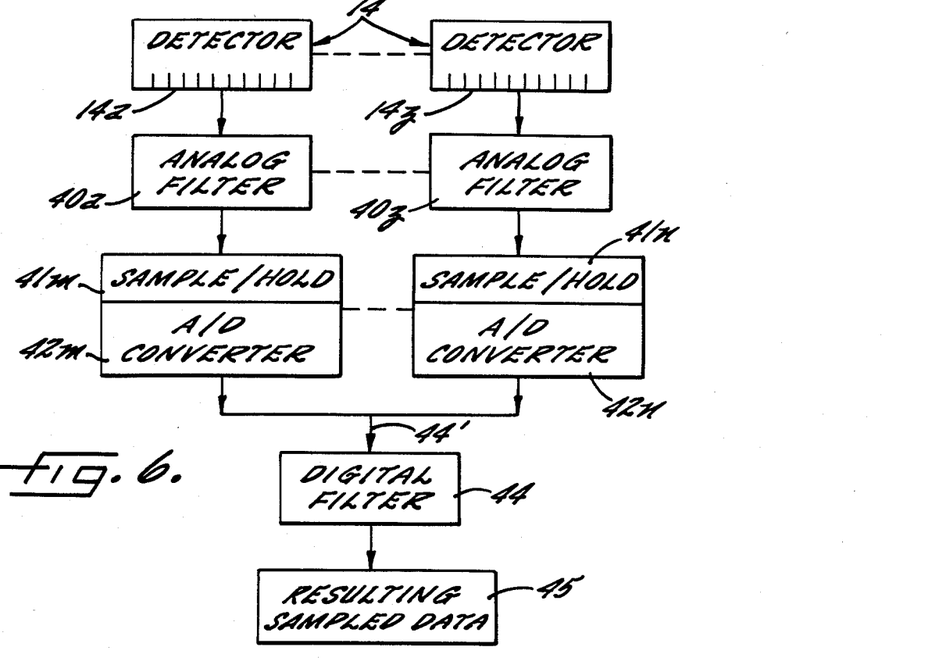
FIG. 6 is a block diagram showing a sampled data system for a CT scanner exemplifying the present invention.

Turning to FIG. 6, there is schematically illustrated the detector 14 broken down into a plurality of detector channel groups 14a-14z. The signals from each channel 14a-14z are passed to analog circuitry, including respective analog filters 40a-40z, one for each channel. The filtered signals are then multiplexed and passed to sampling and digitizing circuitry including sample and hold amplifiers 41m, 41n and analog to digital converters 42m, 42n which serve to digitize the sampled analog signal. The output of each analog to digital converter 42m, 42n is a sequence of digital words, which represent the magnitudes of the associated detector signals for that view, possibly distorted by the sampling process due to the non-ideal characteristics of the associated analog filter. All of the digital signals are passed to a digital filter 44 where, in accordance with the present invention, the digital signals are again filtered to produce a composite filter characteristic more nearly approaching the ideal sharp cutoff. The resulting sampled data 45 thus has minimum distortion introduced by the sampling process or by noise, and has characteristics comparable in accuracy to the aforementioned integrating system.

Among the choices available for configuration of an analog filter in practicing the present invention are the Butterworth, Bessel and Chebyshev Filters. The Butterworth filter has (of all filters) the maximum flatness of response at DC. However, it is also characterized by a group delay which is poor for frequencies near cutoff. The Bessel filter, on the other hand, has a maximally flat group delay characteristic near DC, but a more gradual amplitude rolloff than the Butterworth. The Chebyshev filter has minimum ripple in either pass band or stop band regions.

In practicing the invention in connection with the type of detector system here being considered, it is preferred to utilize a 3-pole Butterworth filter with a 3db frequency of 380 Hz in order to take advantage of its flat response at DC and its relatively sharp rolloff, and to compensate for the poor phase characteristics with the digital filter. The Butterworth filter can be designed to produce low attenuation below cutoff and high attenuation beyond cutoff, although phase distortion or non-constant group delay is introduced. The latter is compensated for by the digital filter as will be described below. It is emphasized, however, that the details of this specific implementation are only one example of the practice of the broader invention.

Figure 7A:
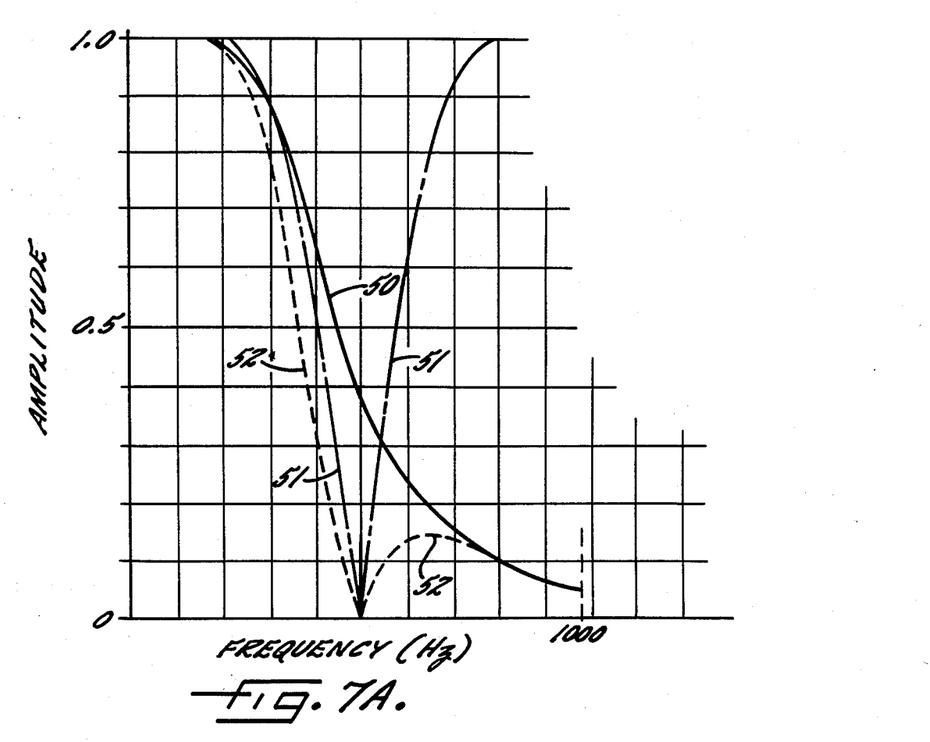
FIGS. 7A-7C illustrates filter characteristics achievable in accordance with the present invention.

One example of a useful composite characteristic produced by properly coordinating analog and digital filters is illustrated in FIG. 7A. The curve 50 represents the amplitude response characteristic of the 3-pole 380 Hz Butterworth filter through which the detector signals are passed before sampling. The output of the analog filter is sampled at a 1000 Hz rate and digitized. In one application the resulting digital data are filtered with a 4 term digital filter. The amplitude response of the digital filter is shown by curve 51 in FIG. 7A. The curve 52 shows the combined response. It can be seen that the composite response has a steeper roll-off than the analog filter alone.

Figure 7B:
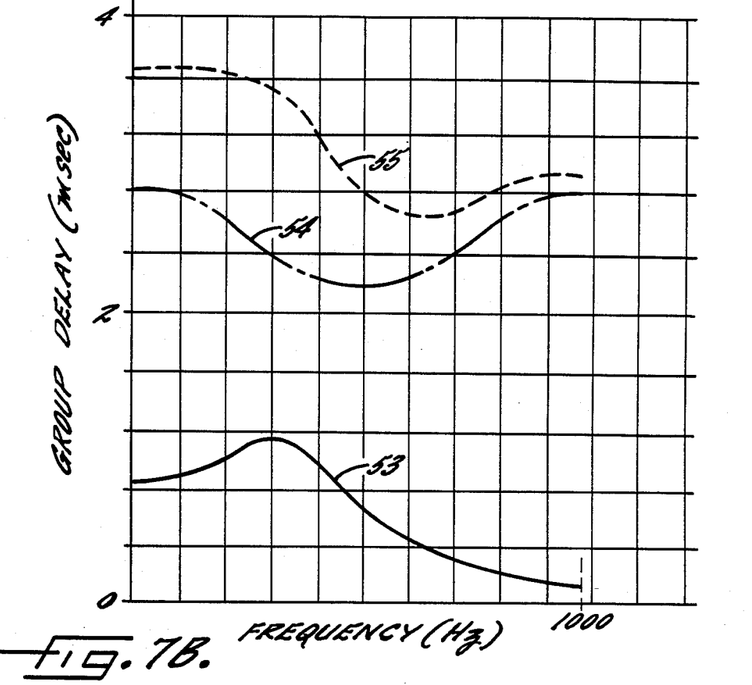

Curve 53 in FIG. 7B shows the group delay for the 380 Hz 3-pole Butterworth filter. For applications such as this one, overall delay is not crucial but it is desirable to have the group delay be flat. In practicing the invention, the group delay of the digital filter compensates the analog characteristic to produce a flatter composite group delay. The group delay for the digital filter is shown by curve 54 and curve 55 shows the composite group delay. It is seen that the digital filter has flattened the group delay, particularly at the lower frequencies.

Figure 7C:
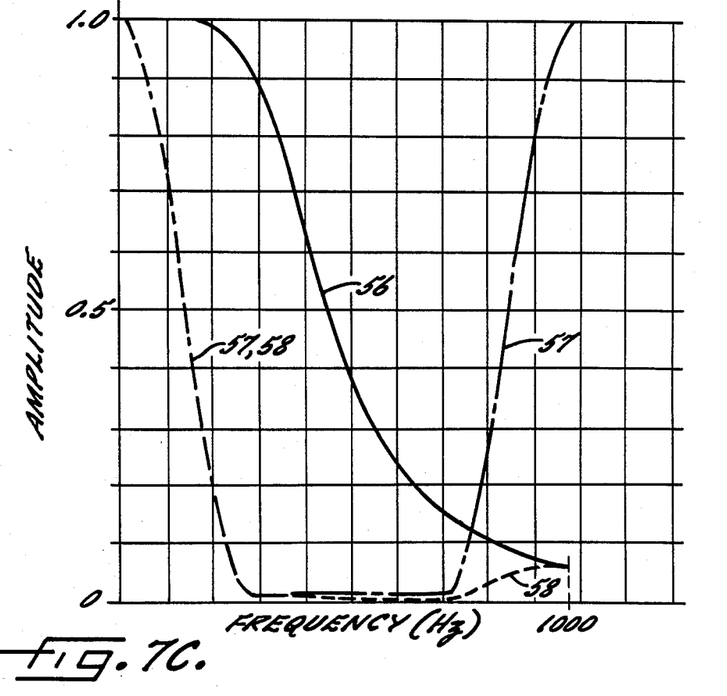

FIG. 7C illustrates application of the invention to a case where the scan speed has been reduced and therefore the bandwidth of the signal has been decreased. Curve 56 in FIG. 7C again shown the amplitude response of the same analog filter discussed in connection with FIG. 7A. The output of the analog filter is still sampled at a 1000 Hz rate but now the digitized data are filtered using a different kernel. The amplitude response of a particular 8 term filter is shown by curve 57. Curve 58 shows that the composite response is band limited to a lower frequency which is compatible with the slower scan speed. In this way, the bandwidth of the data acquisition system can be adjusted as the scan speed is changed. Note that since the bandwidth of the system has been significantly reduced a sampling rate of 1000 Hz is not required after the digital filtering step. Digitally, the sampling rate can be reduced by an integer amount merely by discarding the appropriate samples after the digital filtering operation. For example, only 1 output out of n can be retained resulting in an n-fold reduction of the sampling rate. This is equivalent to calculating filtered outputs every n input samples. This resampling process coupled with the digital filtering results in compression of the data and a reduced data rate to the rest of the system.

In the application described above the digital filter was used to control the bandwidth and adjust the group delay. For other applications an analog filter with some loss of amplitude at some frequencies can be coupled with a digital filter that compensates for the loss. One could also use an analog filter that is peaked at a range of frequencies (as can happen with a Chebyshev filter) and compensate for this peaking with the digital filter.

FIG. 7A illustrates the characteristics of the analog, digital, and composite frequency responses, and the following will describe the process by which the characteristic of the digital filter was matched to that of the analog filter. For a comparatively short filter, it is preferable to establish a set of constraints and use those constraints to calculate the filter coefficients directly. A useful set of constraints are that the filter be normalized (i.e., that the coefficients add to 1), that the composite response at the cutoff frequency be zero, and that the composite characteristic be maximally flat at the origin. In order to compensate for phase delay in the analog system, it is also useful to require a symmetric impulse response for the total filter. Using those constraints and the 380 Hz Butterworth filter for design of a four term compensating digital filter, yields the coefficients (0.036, −0.188, 0.464, 0.688). In the case of longer digital filters, it is sometimes found more convenient, rather than calculating filter coefficients directly as above, to use inversal design techniques as described in the literature, such as "Digital Signal Processing" by A. V. Oppenheim and R. W. Schafer published by Prentiss Hall 1975 (p. 132).

To operate a high resolution detector such as that considered herein in a sampled data environment, the possibility exists of acquiring data faster than it can be stored on disk. It is not overly difficult to operate a sampling system at about a 1 millisecond sampling rate, which is a useful rate for good high frequency resolution in a CT scanner. Using a 736 channel detector, that would tend to produce data at a rate of 736,000 words per second, a rate too high for storage to disk by the CT host computer. It is desirable to limit the data rate to the host for storage to about 256,000 words per second.

In practicing an important aspect of the present invention, the digital filter, in addition to providing the functions described above, also performs data compression to produce an output data rate more compatible with the host computer. For example, when operating in the fast scan mode (i.e., two seconds), the above described four-term digital filter is used. Four views are loaded into a buffer for processing and the filter applied to each channel of those four views to produce one output view. Rather than increment the filter along the views by one view as would be conventional, the filter instead is incremented by two views and the process repeated. Thus, for each two input views only one output view is produced in effect "compressing" the data to produce a slower output data rate. An eight-term filter is also provided for use in a 4:1 data compression mode. In that case, eight views must be loaded into a buffer for processing in order to produce an output view. But after the output view is produced, the filter is incremented by four views. As a result, for each four input views only one output view is produced, achieving a 4:1 data compression. Twelve term and sixteen term filters have also been used for 6:1 and 8:1 compression rates respectively.

In summary, the sampling system has associated therewith a relatively uncomplicated analog filter (few poles) having a characteristic which optimizes the analog to digital acquisition process in that it minimizes components beyond $v_0$. Before processing that digitized information to produce a reconstructed image, it is first operated on by a digital filter which compensates for the deficiencies of the analog filter to achieve a more nearly ideal composite characteristic. In practice, it is preferable to choose an analog filter whose non-idealities are well compensated for by a short digital filter so as to minimize computation time in the digital filter. The combined filters serve to produce digitized data of a character or accuracy typically associated with sampling systems of much greater complexity.

In contrast to the aforementioned state of the art scanner which produced 576 views with 512 readings per view in 9.6 seconds, a scanner utilizing the present invention can have the following characteristics. In order to produce sampled data at the rate of about 500 views per second, the system sampling rate is set at about 1,000 views per second, and a 2:1 data compression is accomplished by the digital processing. Each view includes about 736 readings, and in the fast scan mode the scan is completed in 2 seconds. The analog filter is a three pole Butterworth filter having a cutoff frequency of 380 Hz and having the characteristic generally illustrated by curve 50 of FIG. 7A. The digital filter has the response characteristic 51 of FIG. 7A and is represented by the aforementioned four term filter.

The sample and hold circuits 41 are operated to acquire 1,000 samples per second from each of their associated detector channels as the source and detector rotate about the body, with the x-ray source in the continuous-on mode. The detector signals are passed through the analog filters to the sample and hold circuits for digitization and are then passed to the digital filter. When the digital filter is four terms in length, it takes four views to produce one output view, and the filter is applied in increments of two views, such that for 1,000 input views in a given second, 500 output views per second are produced. Thus, during the course of a 2 second scan, 1,000 output views are produced and filtered, then passed to the reconstruction computer. The samples have comparable accuracy to and are produced at a much faster rate than the aforementioned state of the art scanner, and the end result is the production of images of even higher quality.

In addition to its compensating function, the digital filter also serves to band limit the information in order to tailor the filter to any of a number of different scan speeds. As noted above, the bandwidth of the information from a detector channel is directly proportional to the size of the object being scanned and the scan speed, and inversely proportional to the width of the sampling aperture. Those constraints dictate an output view rate of about 500 Hz for the 2 second scan mode discussed above. However, the scanner in question also has scan speeds of 3, 4 and 8 seconds, and since the bandwidth is inversely proportional to scanning speed, the bandwidth for each of those modes is different. For example, for the 4 second scan mode the bandwidth is only half that for the 2 second scan. Thus after appropriate band limiting the output view rate can be reduced to 250 Hz. Similarly, the output view rate for the 3 second scan mode should be about 375 Hz., and for the 8 second scan mode about 125 Hz.

In accordance with the invention, the same analog filter is used for all scan speeds, but a different digital filter is applied for each different scan speed to serve a band limiting function. The 1,000 Hz sampling rate remains constant, and insures no loss of information due to the sampling process. The bandwidth of the analog filter is slightly higher than that necessary for a 2 second scan, and it has reasonably good though not perfect amplitude and phase response at the frequencies of interest. Each of the digital filters (in the present example 4) is chosen to have a bandwidth matched to the scan speed, to adjust for any inadequacies in the analog response within the associated pass band and the data rate is reduced appropriately after the digital filtering step. In addition, it is desirable that the filter be easily implemented with short computation times.

Taking the 4 second scan mode as an example, the frequencies of interest are those present between 0 and 125 Hz. The broad band detector data (and noise) is band limited by the analog filter and sampled at a 1000 Hz rate. In the case of the 4 second scan, an 8 term digital filter is used (in contrast to the 4 term filter used in the 2 second scan mode) and that serves to adjust the combined filter characteristic to provide a 125 Hz cutoff. Samples are taken every millisecond by the sample and hold circuitry and passed to the digital filter which is operated in a 4-to-1 data compression mode to produce an output sample every 4 milliseconds (250 Hz). In a similar fashion, the 3 second scan mode uses a 6 term filter and operates in a 3-to-1 data compression mode. The 8 second scan mode uses a 16 term filter and operates in an 8-to-1 data compression mode.

Since it is a relatively easy matter to store four such digital filters, and to select the proper one dependent on scan mode, the system not only achieves an improved filter characteristic, but tailors the characteristic to the scan mode being used and does so in a practical manner which can be directly implemented at an affordable price.

It is presently preferred to perform the digital filtering in the array processor of the reconstruction computer as described and claimed in copending Altekruse et al. application Ser. No. 428,761 (U.S. Pat. No. 4,494,141) entitled Dual Purpose Array Processor for a CT Scanner. Processing techniques for using the array processor in compressive digital filtering are described and claimed in copending Acharya et al. application Ser. No. 428,458, (U.S. Pat. No. 4,504,909) entitled Method of Using an Array Processor for Real Time Processing. Both applications are assigned to the same assignee as the present invention, and their disclosures are incorporated herein by reference.

Figure 8:
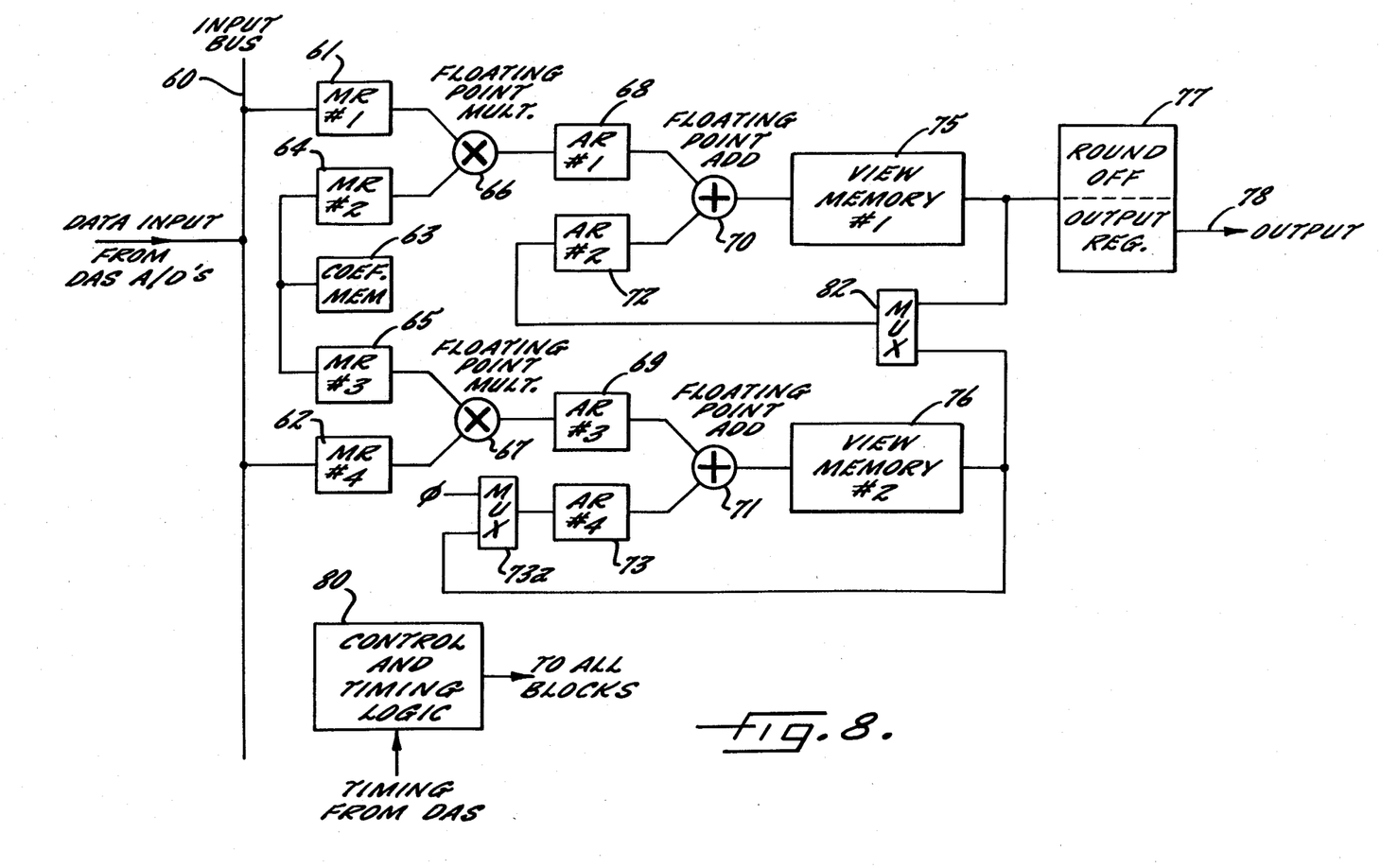
FIG. 8 is a block diagram illustrating a digital filter useful for compensating an analog characteristic in practicing the present invention.

In some cases it may be preferable to provide a separate digital processor for this purpose rather than use the aforementioned array processor. FIG. 8 illustrates such a hardware digital filter. It is seen that a multiline input bus 60 is provided, which is equivalent to the bus 44' of FIG. 6. Thus, a sequence of digital words appear on the bus representative of sequential digitized detector readings for a given view, with the views also appearing in sequence until the completion of a scan. Each word appearing on the bus is clocked into a pair of temporary latches 61, 62 so that it can be convolved with the filter coefficients stored in the memory 63 of the digital filter. The filter coefficients which are being used at a particular time are also temporarily stored in buffers 64, 65. It is seen that the output of each pair of buffers is applied to floating point multipliers 66, 67 which produce at the outputs thereof the product of the filter coefficient and the view sample held in the two associated buffers. That product is coupled to storage registers 68, 69 for addition with previous partial products in order to obtain the convolution of the digitized view data and the filter coefficients stored in memory 63. It is seen that the outputs of the registers 68, 69 are applied to adders 70, 71 along with the outputs of additional registers 72, 73 respectively. The summations produced by the adders 70, 71 are stored in respective locations of view memories 75, 76. The view memories have one location for each detector channel in a view, and thus in the illustrated embodiment provide 736 storage locations. The view memory 75 functions as the output memory, and the results thereof at the appropriate time are rounded off at 77 and output to the reconstruction computer at 78. The view memory 76 functions to accumulate the lower order partial products during the course of applying the filter, and adds the lower order partial products to the information in view memory 75 at the appropriate time.

Control and timing logic 80 is generally responsive to timing signals from the data acquisition system and provides appropriate enabling and clocking signals to each of the aforementioned elements to cause the readings to progress through the system in a manner which will be described below.

The general equation for the digital filter is represented by the following:

$$Y_i = \sum_{j=1}^{2n} c_j V_{n(i-1)+j}$$

where $Y_i$ is the output view, V is the input view, $c_j$ is the weighing coefficient or filter function and n is equal to one-half the number of view terms needed. Thus when the first view term $V_1$ appears on the bus 60 it is clocked into buffers 61, 62. Assuming that the system is operating in the 4 second mode where n is equal to 4, the system uses an eight term filter and requires eight views to produce an output view; the filter is incremented by four views to produce the 2:1 data compression. Thus in this case, the memory register 65 contains the first filter term $C_1$ while the memory register 64 contains the fifth filter term $C_5$. Operation of the upper elements of FIG. 8 is not important until the view memory 76 is filled with the appropriate number of terms. Thus, attention will be focused on the lower portion of the circuit for this initial description. The first term held in the register 62 is multiplied by the first filter factor held in the register 65 by multiplier 67, and the product passed to the register 69. For the first view the multiplexer 73a maintains a zero value in register 73. Accordingly, the product stored in register 69 is added to zero in the adder 71 and stored in the first location in view memory 76. The second term of the first view then appears and is processed in the same way and stored in the second location of view memory 76. That process is repeated until the entire first view has been received, processed and stored in sequential locations in the memory 76.

Subsequently, the first term of the second view appears on bus 60 and is clocked into register 62. Just prior to that, the filter term in the register 65 was changed to the second term $C_2$. Thus the multiplier 67 is operated to multiply each sequential data word in the second view by $C_2$ and pass those products in sequence to the register 69. The multiplexer 73a serves to recirculate the information in view memory 76 to the adder 71 by way of the register 73. Thus, after the second view is processed, the view memory 76 contains the partial product $C_1V_1+C_2V_2$ for all terms of the view. That process is repeated until four views have been processed, at which time the view memory 76 contains the lower order products of the convolution equation, namely $C_1V_1+C_2V_2+C_3V_3+C_4V_4$.

When the first term of the fifth view appears, the upper portion of the circuit of FIG. 8 also comes into play. At this time the coefficient register 65 holds $C_1$ and the coefficient register 64 holds $C_5$. The first word of the fifth view is loaded into both registers 61 and 62 for multiplication with their respective filter coefficients. A multiplexer 82 is operated to route the partial products from the view memory 76 to register 72 for addition to $C_5V_5$ produced by multiplier 66. In all other respects, the circuit operates as described above. For the following view, the multiplexer 82 recirculates information from view memory 75, much like multiplexer 73a, such that at the end of eight views the view memory 75 has a completely filtered output view while the view memory 76 contains the lower order partial products for the next output view. The filtered view is then rounded off at 77 and output to the reconstruction computer at 78.

It will now be appreciated that by control of the multiplexers and of the coefficient memory 63, the system can be configured to operate with filters of different length. In the preferred scanner, four modes are provided: a 2 second scan which uses a four term filter, a 3 second scan which uses a six term filter, a 4 second scan which uses an eight term filter and an 8 second scan which uses a sixteen term filter.

We claim as our invention:

1. In a CT scanner having an x-ray source and a plurality of detector cells for producing and measuring radiation passed through a body, the scanner having a predetermined scan speed, wherein the improvement comprises a sampled data system for producing a plurality of discrete x-ray readings comprising in combination, means responsive to the respective detector cells for producing a plurality of analog signals having magnitudes varying in proportion to the radiation received by the associated detector cells during a scan, a plurality of analog filters for filtering the analog signals each having a non-ideal characteristic, sample and hold means for receiving the filtered signals and producing discrete samples thereof at a sampling rate coordinated to the scanning speed of the scanner, digitizer means for digitizing the sampled signals, and a digital filter operating on the digitized signals and having a predetermined characteristic coordinated to that of the analog filters for compensating for the non-ideal characteristic of the analog filters and producing a more nearly ideal composite filter characteristic.

2. The sampled data system as set out in claim 1 wherein the analog filters have a characteristic which sharply attenuates the analog signals at frequencies above the cutoff frequency but as a result thereof introduce distortion in the analog signals below the cutoff frequency, and the digital filter has a characteristic adapted to compensate for the distortion introduced by the analog filters, thereby to produce a more nearly ideal composite filter characteristic.

3. The sampled data system as set out in claims 1 or 2 wherein the scanner has a plurality of scan speeds but the sample and hold means has only a single sampling rate, wherein the digital filter further comprising a plurality of digital filters corresponding to the plurality of scan speeds, the digital filters having different bandwidths related to the respective scan speeds for band limiting the digitized sampled signals to the bandwidth associated with the respective scan speeds.

4. The sampled data system as set out in claims 1 or 2 wherein the digital filter comprises means for compressing the data rate of the digitized signals to produce output digital signals having a reduced data rate.

5. The sampled data system as set out in claim 1 wherein the analog filters are low-pass Butterworth filters.

6. The sampled data system as set out in claims 1 or 5 wherein the digital filter is configured to have a characteristic adapted to remove distortion introduced into the digitized samples by the analog filters and the sample and hold means.

* * * * *